United States Patent
Park et al.

(10) Patent No.: US 8,784,990 B2
(45) Date of Patent: Jul. 22, 2014

(54) ADHESIVE FILM COMPOSITION FOR GLASS LAMINATION

(75) Inventors: JaeYoung Park, Wonju-si (KR); SeungGweon Hong, Daejeon (KR); HyeLim Kim, Busan (KR); KwangJin Chung, Daejeon (KR); MyungAhn Ok, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 358 days.

(21) Appl. No.: 13/267,282

(22) Filed: Oct. 6, 2011

(65) Prior Publication Data

US 2012/0157637 A1 Jun. 21, 2012

(30) Foreign Application Priority Data

Dec. 16, 2010 (KR) ........................ 10-2010-0129063

(51) Int. Cl.
  *C09J 169/00* (2006.01)
  *C09J 175/04* (2006.01)
  *C09J 7/00* (2006.01)

(52) U.S. Cl.
  USPC ........... 428/412; 524/108; 524/308; 525/467; 528/85

(58) Field of Classification Search
  None
  See application file for complete search history.

(56) References Cited

U.S. PATENT DOCUMENTS

| 3,764,457 | A | * | 10/1973 | Chang | 428/412 |
| 5,126,428 | A | | 6/1992 | Freitag et al. | |
| 6,872,797 | B2 | * | 3/2005 | Ueno et al. | 528/85 |

FOREIGN PATENT DOCUMENTS

| JP | 11181262 | * | 7/1999 |
| KR | 0148235 B1 | | 8/1998 |
| KR | 10-2009-0090154 A | | 8/2009 |
| KR | 10-2010-0013255 A | | 2/2010 |
| KR | 10-2010-0067593 A | | 6/2010 |

* cited by examiner

*Primary Examiner* — David Buttner
(74) *Attorney, Agent, or Firm* — The Webb Law Firm

(57) ABSTRACT

Provided is a resin composition based on polyalkylene carbonate for use as an adhesive film composition for glass lamination, and more particularly, to a resin composition in which a plasticizer and isocyanate are added to polypropylene carbonate or polyethylene carbonate as polyalkylene carbonate to introduce a urethane group. As such, the resin composition of the present invention can improve an adhesive strength by addition of isocyanate, and secure flexibility by using the plasticizer. In particular, an adhesive sheet based on polyalkylene carbonate can decompose a polymer laminate layer through simple heat treatment to fully collect glass when defects of glass lamination are generated, thereby reducing the loss of glass due to process failure, be stable to moisture so that transport, storage, and use thereof are not limited, and perform lamination even at a lower process temperature.

4 Claims, 1 Drawing Sheet

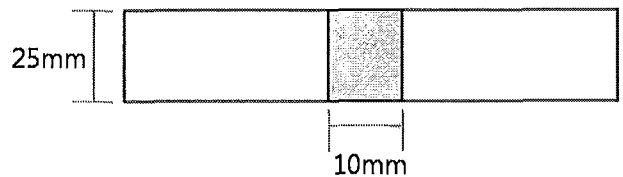

ADHESIVE FILM COMPOSITION FOR GLASS LAMINATION

CROSS-REFERENCE TO RELATED APPLICATIONS

This application claims priority under 35 U.S.C. §119 to Korean Patent Application No. 2010-0129063, filed on Dec. 16, 2010, in the Korean Intellectual Property Office, the disclosure of which is incorporated herein by reference in its entirety.

TECHNICAL FIELD

The present invention relates to an adhesive film composition for glass lamination having excellent adhesive strength and low-temperature flexibility, which enables a polyalkylene carbonate resin to be used for an adhesive sheet or film for laminated safety glass allowing glass recycling.

BACKGROUND

When a glass is broken due to impact, sharp glass fragments can cause injury to a human body, and a glass processed in order to prevent this is referred to as a safety glass in the broad sense. There are a laminated glass, a tempered glass, a wire plate glass, and the like, as the safety glass, and among them, a safety glass used in the narrow sense means a laminated glass, which is usually referred to as a laminated safety glass. The simplest structure of the laminated safety glass is that a laminated sheet is attached between two sheets of normal or tempered glass. According to the performances requested, multi-laminated safety glass, such as triple or quadruple laminated safety glass, may be used.

The laminated safety glass may be applied in various fields, such as a residential field including veranda window glass of high-rise apartments, partition glass of a bath room, and glass used in a door, a building field including skylights and the like, a vehicle field including front glass of car or train, and a safety or security field including bullet-proof glass through which bullets can not pass, an anti-theft glass of a store for managing valuables, an anti-riot glass of a prison, and the like.

The adhesive film or sheet for the laminated safety glass needs to satisfy high adhesive strength to glass, transparency, stability to sunlight and UV light, high tear strength, impact absorbing property, and the like.

Several kinds of material may be used as the adhesive sheet, but polyvinyl butyral (PVB) is the most commonly used in view of physical properties, performances, or manufacture. Beside this, ethylene vinyl acetate (EVA) or thermoplastic polyurethane (TPU) is partially being used.

A polyvinyl butyral (PVB) resin is obtained by butylating polyvinyl alcohol, and a butylation degree thereof is controlled at the time of adhering with glass, thereby allowing the PVB resin to have the required level of adhesive strength. However, the PVB resin is very tough and has high hardness. Therefore, even though the PVB resin is manufactured in a flat shape, the PVB resin is not easy to use at the time of manufacturing laminated glass. Furthermore, when the PVB resin is laminated on glass to manufacture laminated glass, penetration resistance that prevents an impact object from penetrating glass is difficult to secure. For this reason, addition of an appropriate level of plasticizer is needed to produce a film type having flexibility. Various kinds of additives may be used according to the application field, the requested performance, and the method for manufacturing the laminated glass, and thickness, adhesive strength, color, surface roughness, and the like may be differently exhibited depending on the kind of additive.

The laminated safety glass is obtained by putting an adhesive film between plate glasses after washing and drying of the adhesive film, putting the resultant the plate glasses with the adhesive film in an autoclave into which oil pressure or vapor pressure is applied, and pressing the resultant plate glasses with the adhesive film at 120 to 130° C. under about 15 kg/cm$^2$.

A front glass of a car is usually referred to as a high penetration resistance (HPR) glass, for which a film having a thickness of 0.76 mm is mainly used. Here, it is important to make an adhesive film maintain an adhesive strength to glass at an appropriate level so that penetration resistance can be secured.

An adhesive film for building has a thickness of at least 0.38 mm, and may have a thickness of above 0.38 mm according to the performances and the needs in manufacturing the laminated glass.

The PVB film is being widely used due to excellent mechanical strength and adhesive strength thereof. However, the PVB film has a hydrophilic property, and thus, very sensitive to moisture. Therefore, when the film absorbs moisture, adhesive strength is deteriorated or there occurs color change or bubble generation. Therefore, since the PVB film or sheet needs to retain uniform humidity at a low temperature at the time of storage or transport, the PVB film or sheet needs to be separately water-proof packaged and needs to be stored or managed under appropriate temperature or humidity after unpackaging. In addition, in a case where bubble generation or binding failure occurs during working, the adhesive sheet and the glass are not easily separated from each other, and thus the entire glass should be discarded. In addition, when the laminated glass using PVB is severely exposed to moisture, a portion of the laminated glass may be delaminated, which prevents laminated glass from being used as a partition of the bathroom.

SUMMARY

An embodiment of the present invention is directed to providing an adhesive film composition for glass lamination, capable of securing flexibility at a low temperature and improving an adhesive strength to glass, by using polyalkylene carbonate, which is stable to moisture and has excellent transparency and excellent adhesive strength to the glass. Another embodiment of the present invention is directed to providing an adhesive film composition for glass lamination capable of being stable to temperature and humidity at the time of transport, storage, and use, and allowing glass to be recycled and collected when product failure occurs.

Other features and aspects will be apparent from the following detailed description, the drawings, and the claims In one general aspect of the present invention, an adhesive film composition for glass lamination includes an isocyanate compound and a plasticizer based on a polyalkylene carbonate resin.

The polyalkylene carbonate resin may have a weight average molecular weight of 50,000 to 300,000 g/mol, and may include polypropylene carbonate or polyethylene carbonate.

The polyalkylene carbonate resin is stable to moisture, and has excellent transparency and adhesive strength to glass. However, the polyalkylene carbonate resin has low flexibility at a low temperature, and thus has difficulty in securing mechanical safety at a low temperature. For this reason, a plasticizer capable of minimizing the reduction in adhesive strength and securing flexibility at a low temperature may be added.

The plasticizer has excellent compatibility with the polyalkylene carbonate resin, and the content thereof may be regulated depending on uses, thickness, adhesive strength, and the like, as necessary.

The plasticizer used in the present invention may be selected from compounds of Chemical Formula 1 and 2 below.

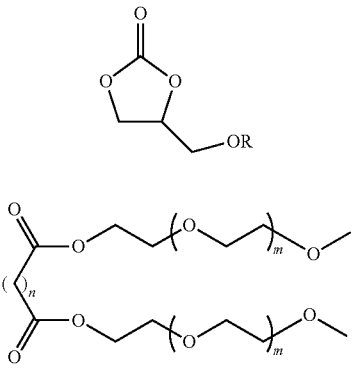

[Chemical Formula 1]

[Chemical Formula 2]

As the plasticizer used in the present invention, glyceryl carbonate of Chemical Formula 1 and derivative compounds thereof may be used. In Chemical Formula 1, R represents a hydrogen atom; linear (C1-C18) alkyl; and carbonyl substituted with linear (C1-C18) alkyl, (C6-C18) alkylcyclohexyl, or (C7-C20)alkyl(C6-C18)aryl; and may be selected from a hydrogen atom, octanoyl, decanoyl, dodecanoyl, tetradecanoyl, octyl, decyl, dodecyl, and tetradecyl.

As another plasticizer used in the present invention, a compound having a structure in which an ethylene glycol oligomer is linked to a diacid backbone represented by Chemical Formula 2. In Chemical Formula 2, n represents an integer of 0 to 4, and m represents an integer of 1 to 5.

The plasticizer according to the present invention may be contained in a content of 2 to 40 parts by weight based on 100 parts by weight of the polyalkylene carbonate resin. If the content of the plasticizer is below 2 parts by weight, flexibility or processability which can be exhibited by the plasticizer can not be achieved. If the content of the plasticizer is above 40 parts by weight, mechanical properties are difficulty to secure, and viscosity is lowered or an adhesive strength is reduced.

In the present invention, low-molecular weight polypropylene carbonate or polyethylene carbonate having a weight average molecular weight of 300 to 5000 g/mol may be used as another plasticizer.

The plasticizer according to the present invention is preferable since it can solve the problems that cyclic propylene carbonate, di-octyl phthlate, di-ethylene glycol di-benzoate, di-propylene glycol di-benzoate, and acetyl tri-n-butyl citrate known as the existing plasticizer of polypropylene carbonate or polyethylene carbonate have fast evaporating rate or insufficient compatibility, and can have excellent flexibility at a low temperature and stable mechanical properties.

A material having a structure, in which an ethylene glycol oligomer is linked to a backbone of the existing phthalic acid and terephthalic acid represented by Chemical Formula 3 below, also has been known as a plasticizer of polypropylene carbonate or polyethylene carbonate. However, this plasticizer has difficulty in imparting an adhesive strength and flexibility having levels higher than those of adhesive strength and flexibility of the existing plasticized PVB sheet, which are required by the present invention.

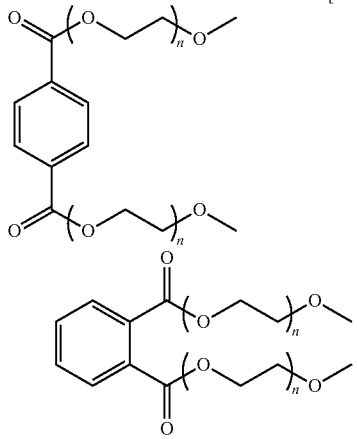

[Chemical Formula 3]

(In Chemical Formula 3, n represents an integer of 1 to 7.)

In the adhesive film composition of the present invention, the polyalkylene carbonate resin causes a plasticization reaction using the specialized plasticizer, and thus, may have a lower adhesive strength to glass as compared with a resin sheet or film itself. In order to supplement this, an isocyanate compound is reacted with an end of a resin backbone to add a polar group allowing a hydrogen bond, thereby increasing the adhesive strength.

The isocyanate compound may be one or more selected from the group consisting of 2,4-toluene diisocyanate (TDI), 4.4'-diphenyl methane diisocyanate (MDI), xylene diisocyanate (XDI), methaxylene diisocyanate, MXDI), 1,6-hexamethylene diisocyanate (HDI), iso-phoron diisocyanate (IPDI), 4,4'-methylene bis(cyclohexyl isocyanate) which is hydrogenated MDI (H12MDI), methyl cyclohexane 2,4(2,6)diisocyanate which is hydrogenated TDI (HTDI), and 1,3-(isocyanate methyl)cyclo-hexane which is hydrogenated XDI (H6XDI).

An adhesive film composition for glass lamination using the polyalkylene carbonate resin, which reacts with the isocyanate compound in the above manner, can have an excellent adhesive strength to glass, have an adhesive strength having the same level as the existing plasticized PVB sheet, which is required for the laminated glass regardless of plasticization thereof, secure flexibility at a low temperature to prevent the deterioration of mechanical property, and excellent transparency and penetrating property.

In the adhesive film composition for glass lamination according to the present invention, the temperature at the time of a glass lamination process may be 100 to 160° C. If the process temperature deviates from the above range, economic efficiency may be lowered or collection of recycled glass may be difficult.

In particular, if defects are generated in the adhesive film composition for glass lamination according to the present invention during processing, the adhesive composition is heated at a temperature of 250° C. or higher for 30 minutes or longer, and thus, a polymer layer is decomposed to allow glass to be fully collected and recycled. Therefore, economic efficiency can be improved and waste materials can be reduced.

The polyalkylene carbonate used in the present invention is manufactured based on the description in Korean Patent Laid-open Publication Nos. 2009-0090154, 2010-067593, and 2010-0013255.

The adhesive film or sheet manufactured by the adhesive film composition for glass lamination according to the present invention may be used for indoor or outdoor safety glass for building or safety glass for a car, and these are provided just as examples and do not limit the present invention.

BRIEF DESCRIPTION OF THE DRAWINGS

FIG. 1 is a sample for a test of adhesive strength of a sheet according to Example 1 of the present invention

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, the present invention will be described in more detail with reference to the following examples. However, the following examples describe the present invention by way of example only but are not limited thereto.

Example 1

A polypropylene carbonate resin having a weight average molecular weight of 200,000 g/mol was reacted with an equivalent of hexamethylene diisocyanate (Hereinafter, HDI), and then 10 parts by weight of glyceryl carbonate octanoate was added thereto based on 100 parts by weight of polypropylene carbonate, followed by mixing at 160° C. for 5 minutes in a Brabender mixer. The resultant material was pressed by a heating press to prepare a sheet having a thickness of 0.7 mm, which is then manufactured into several dumbbell types of specimens. Tensile strength and elongation of each specimen were measured, and Tg thereof was measured by using DSC. A specimen having a size of 25 mm×10 mm is attached between two glass substrates as shown in FIG. 1, at 140° C. for 1 minute, and then an adhesive strength was measured by using a UTM. Test speed was set to 50 mm/min. The test results were tabulated in Table 1.

Example 2

An adhesive film composition was prepared by the same method as Example 1, except that, instead of glyceryl carbonate octanoate, di(triethylene glycol monomethyl ether) glutarate was used. Test results were tabulated in Table 1.

Example 3

An adhesive film composition was prepared by the same method as Example 1, except that, instead of glyceryl carbonate octanoate, polypropylene carbonate having a weight average molecular weight of 500 g/mol was used. Test results were tabulated in Table 1.

Example 4

An adhesive film composition was prepared by the same method as Example 1, except that, instead of hexamethylene diisocyanate (HDI), iso phoron diisocyanate (IPDI) was used. Test results were tabulated in Table 1.

Example 5

An adhesive film composition was prepared by the same method as Example 1, except that, instead of polypropylene carbonate, polyethylene carbonate was used. Test results were tabulated in Table 1.

Comparative Example 1

An adhesive film composition was prepared by the same method as Example 1, except that, instead of glyceryl carbonate octanoate, cyclic propylene carbonate was used. Test results were tabulated in Table 1.

Comparative Example 2

An adhesive film composition was prepared by the same method as Example 1, except that, instead of glyceryl carbonate octanoate, di(triethylene glycol monomethyl ether) terephthalate was used. Test results were tabulated in Table 1.

Comparative Example 3

An adhesive film composition was prepared by the same method as Example 1, except that the plasticizer was not used. Test results were tabulated in Table 1.

Each resin composition was prepared by the same method, and the test results were set forth in Table 1.

Comparative Example 4

An adhesive film composition was prepared by the same method as Example 1, except that, polypropylene carbonate unreacted with the isocyanate compound was plasticized by glyceryl carbonate octanoate. Test results were tabulated in Table 1.

Comparative Example 5

Test was performed on a PVB sheet having a thickness of 0.76 mm, which is actually used as an adhesive sheet for a car, by the same method as Example 1. Test results were tabulated in Table 1.

TABLE 1

| | Tensile strength (Kgf/cm$^2$) | elongation (%) | Adhesive strength to glass (Kgf) | Tg(° C.) | Bleeding | Evaporation weight loss (%) @100% |
|---|---|---|---|---|---|---|
| Example 1 | 297 | 160.8 | 39.2 | 9.1 | No | 1.1 |
| Example 2 | 290 | 162.2 | 38.3 | 10.9 | No | <0.5 |
| Example 3 | 298 | 153.6 | 39.8 | 9.7 | No | <0.5 |
| Example 4 | 290 | 160.9 | 38.2 | 9.6 | No | <0.5 |
| Example 5 | 281 | 170.8 | 36.9 | 7.1 | No | <0.5 |
| Comparative example 1 | 220 | 172.2 | 32.3 | 11.9 | No | 5.2 |
| Comparative example 2 | 240 | 117.9 | 18.2 | 20.1 | No | <0.5 |
| Comparative example 3 | 390 | 20.8 | 48.7 | 35.8 | | <0.5 |
| Comparative example 4 | 290 | 150.8 | 21.8 | 11.5 | No | <0.5 |
| Comparative example 5 | 294 | 150.5 | 37.6 | 19.0 | No | <0.5 |

When Tg is above 25° C., Brittle was performed at room temperature.

As shown in Table 1, the adhesive film composition for glass lamination according to the present invention exhibited similar or excellent tensile strength and glass adhering strength as compared with the PVB adhesive sheet for a car. In particular, Examples 1 to 5 including the plasticizer according to the present invention exhibited excellent mechanical properties, such as tensile strength and elongation, as compared with Comparative examples 1 and 2 not including the plasticizer according to the present invention. Comparative example 3 not including a plasticizer exhibited high tensile strength, but low elongation, which confirmed that flexibility was decreased. Furthermore, Comparative example 1 included a plasticizer of polypropylene carbonate, but compatibility thereof was not good due to fast evaporating rate. Bleeding did not absolutely occur in added plasticizers of Examples and Comparative examples.

It can be confirmed that Examples 1 to 5 according to the present invention can function to hold glass fragments when the glass fragments fly due to impact because adhesive strength thereof was strong and impact strength was not decreased, as compared with Comparative example.

When the PVB of Comparative example 5 used as the adhesive film in the past adheres to glass, it can be not removed from the glass. Therefore, when defects are generated due to the process characteristic, the entire glass should be discarded. However, it can be confirmed from the examples according to the present invention that glass can be fully collected through heat treatment, thereby improving economic efficiency and offering environment-friendly characteristics due to reduction in generation of waste materials.

The present invention can provide an adhesive film composition based on polyalkylene carbonate in which a polymer can be decomposed through simple heat treatment to fully collect glass when defects of glass lamination are generated, transport, storage, and use conditions are not limited due to stability to moisture which is caused by hydrophobic property of polymer materials, and lamination can be performed even at a temperature about 10 to 20° C. lower than that of a case where the existing PVB sheet is used. In particular, the composition having improved adhesive strength and flexibility can be used to manufacture an adhesive sheet for laminated safety glass, and can be easily used in molding and manufacturing in various fields across all industries.

As described above, although the present invention has been described in connection with the preferred examples, those skilled in the art will be appreciated that modifications and variations can be made without departing from the spirit and scope of the invention as defined by the appended claims. Accordingly, the present invention is not limited to the above examples.

What is claimed is:

1. An adhesive film composition for glass lamination, comprising:
a polyalkylene carbonate resin;
a plasticizer; and
an isocyanate compound,
wherein the polyalkylene carbonate resin has a weight average molecular weight of 50,000 to 300,000 g/mol, and is selected from polypropylene carbonate and polyethylene carbonate, and
wherein the plasticizer is low-molecular weight polypropylene carbonate or polyethylene carbonate having a weight average molecular weight of 300 to 5000 g/mol, or is selected from a compound represented by Chemical Formulas 1 and 2:

[Chemical Formula 1]

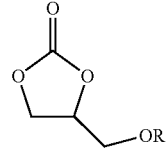

wherein in Chemical Formula 1, R represents a hydrogen atom; linear C1-C18 alkyl; and carbonyl substituted with linear C1-C18 alkyl or C6-C18 alkylcyclohexyl;

[Chemical Formula 2]

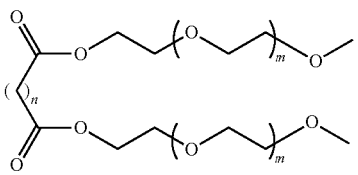

wherein in Chemical Formula 2, n represents an integer of 0 to 4, and m represents an integer of 1 to 5.

2. The adhesive film composition for glass lamination of claim 1, wherein the plasticizer is used in a content of 2 to 40 parts by weight based on 100 parts by weight of the polyalkylene carbonate resin.

3. The adhesive film composition for glass lamination of claim 1, wherein the isocyanate compound is one or more selected from the group consisting of 2,4-toluene diisocyanate (TDI), 4.4'-diphenyl methane diisocyanate (MDI), xylene diisocyanate (XDI), methaxylene diisocyanate (MXDI, 1,6-hexamethylene diisocyanate (HDI), iso phoron diisocyanate (IPDI), 4,4'-methylene bis(cyclohexyl isocyanate) which is hydrogenated MDI (H12MDI), methyl cyclohexane 2,4(2,6) diisocyanate which is hydrogenated TDI (HTDI), and 1,3-(isocyanate methyl)cyclo-hexane which is hydrogenated XDI (H6XDI).

4. A laminate of an adhesive film composition laminated on glass at a temperature of 100 to 160° C. comprising:
a polyalkylene carbonate resin;
a plasticizer; and
an isocyanate compound,
wherein the polyalkylene carbonate resin has a weight average molecular weight of 50,000 to 300,000 g/mol, and is selected from polypropylene carbonate and polyethylene carbonate, and
wherein the plasticizer is low-molecular weight polypropylene carbonate or polyethylene carbonate having a weight average molecular weight of 300 to 5000 g/mol, or is selected from a compound represented by Chemical Formulas 1 and 2:

[Chemical Formula 1]

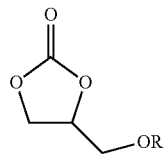

wherein in Chemical Formula 1, R represents a hydrogen atom; linear C1-C18 alkyl; and carbonyl substituted with linear C1-C18 alkyl or C6-C18 alkylcyclohexyl;

[Chemical Formula 2]

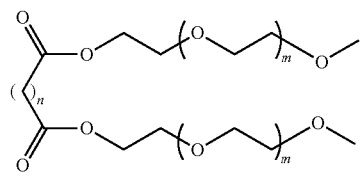

wherein in Chemical Formula 2, n represents an integer of 0 to 4, and m represents an integer of 1 to 5.

* * * * *